Figure 1:
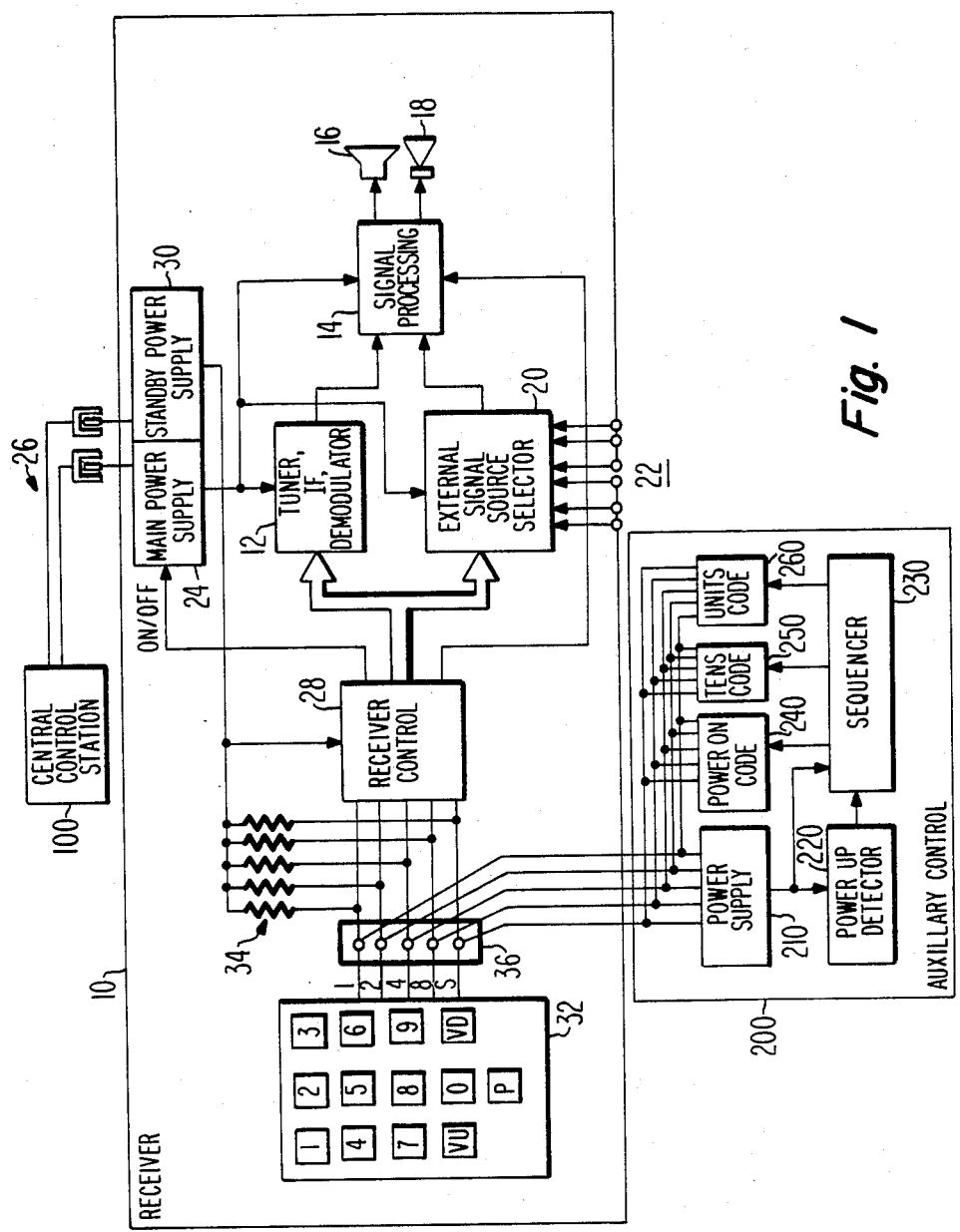

United States Patent [19]

Mengel

[11] Patent Number: 4,651,342
[45] Date of Patent: Mar. 17, 1987

[54] AUXILIARY CONTROL UNIT FOR A TELEVISION RECEIVER

[75] Inventor: William H. Mengel, Burlington County, N.J.

[73] Assignee: RCA Corporation, Princeton, N.J.

[21] Appl. No.: 703,412

[22] Filed: Feb. 20, 1985

[51] Int. Cl.[1] .............................................. H04B 1/16
[52] U.S. Cl. ......................................... 455/151; 455/4; 455/186; 455/343; 358/190
[58] Field of Search .................... 455/4, 151, 185, 186, 455/343, 352, 353, 355; 358/190, 194.1

[56] References Cited

U.S. PATENT DOCUMENTS

| | | | |
|---|---|---|---|
| 3,602,822 | 8/1971 | Evans et al. | |
| 4,162,513 | 7/1979 | Beyers, Jr. et al. | 358/191.1 |
| 4,227,259 | 10/1980 | Mogi | 455/355 |
| 4,271,532 | 6/1981 | Wine | 455/186 |
| 4,281,349 | 7/1981 | George | 455/343 |
| 4,457,021 | 6/1984 | Belisomi | 455/343 |
| 4,523,295 | 6/1985 | Zato | 358/190 |

OTHER PUBLICATIONS

Pages 3–40, 3–41, 3–42, 3–43, 3–46 and 3–47 from the JVC Service Manual for the Model HR-765OU Color Video Cassette Recorder, No. 8216-B, published by the Victor Company of Japan, Ltd., in 1982.
"RCA Television Service Data Chassis CTC 91 Series", file 1978 C-3.
"RCA Television Service Data Chassis CTC 111 Series", file 1981 C-3 and file 1981 C-3-S1.

Primary Examiner—Jin F. Ng
Attorney, Agent, or Firm—Eugene M. Whitacre; Paul J. Rasmussen; Peter M. Emanuel

[57] ABSTRACT

Auxiliary control apparatus for an electronically controlled television receiver is coupled to the conductors between the keyboard and the control unit of the receiver to simulate user initiated power on and initial channel or other input source selection commands when AC line power is initially applied to the receiver. To cause this, the auxiliary control unit is responsive to the initial development of standby operating power by a standby power supply. Operating power for the auxiliary control unit is derived by drawing current from pull-up resistors connected to the conductors between the keyboard and the control unit. The auxiliary control apparatus is useful for use with institutional receivers which are to be turned on by the application of AC line power through a central control station and which are set to tune a predetermined channel or select another predetermined input signal source when turned on.

16 Claims, 2 Drawing Figures

AUXILIARY CONTROL UNIT FOR A TELEVISION RECEIVER

The present invention concerns an arrangement for automatically turning a receiver such as a television receiver on and/or automatically selecting a preferred channel or other television signal source when operating power is initially developed by the receiver, e.g., when AC line power is initially applied to the receiver.

When a number of television receivers are employed in institutions such as hospital, educational and entertainment facilities, a central control station is often used for selectively turning the receivers on and off by the selective connection to the AC power lines through the central control station. In addition, in institutional environments the television signals are usually distributed through a cable distribution network. Typically, this requires that each television receiver must be tuned to the appropriate television channel for receiving the television signals from the cable distribution network.

If the receivers used in the institution are of the type which have mechanical on/off switches and a mechanical channel selector the on/off switches may be left in the on position and the channel selectors may be set so that the receivers will be turned on and will tune the appropriate channel for the cable distribution network when AC line power is applied through the central control station. However, if the receivers are of the type which have electronic controls to control their functions such as the on/off state and the channel selection, they cannot be left in the on state in the absence of AC line power. Accordingly, when AC line power is applied through the central control station, the receivers will not be turned on as desired. Furthermore, the receivers may not be tuned to the appropriate channel for the cable distribution network even when turned on because the initial channel tuned the receiver is turned on may be a completely random one. Although many modern commercially available television receivers equipped with electronic controls have initialization provisions for automatically tuning the receiver to an initial channel which is preset by the manufacturer (e.g., the lowest channel) when the receiver is initially turned on or memory provisions for automatically tuning the last channel selected by a user prior to the receiver being turned off when the receiver is again turned on, such provisions may be unsuitable for institutional receivers because the preset channel may not correspond to the appropriate channel for the cable distribution network and if the last channel is not stored in a nonvolatile memory it will be lost when AC line power is removed. The same problem of the inappropriate channel being initially tuned occurs when receivers used in an institution are of the type which have mechanical on/off switches and electronically controlled tuners since, while the receivers may be turned on by the application of AC line power from the central control station, they may not be tuned to the appropriate channel for the reasons given above.

Similar problems to the one described above relating to the inability of electronically controlled receivers to be turned on and/or to tune a preferred channel when AC line power is initially applied also exist in a home environment when a cable converter is used which has provisions for applying AC line power to the receiver when a cable channel is selected.

If a receiver intended for institutional or home use has a nonvolatile last channel memory, the abovedescribed problem concerning selecting the appropriate channel for cable reception when AC line power is initially applied will be alleviated since the last channel selected will most likely be the appropriate one. To an extent, the same applies to a receiver which has provisions for maintaining the last channel with standby intended for connection to a cable converter in a home since when the receiver is turned on by means of the on/off controls the last channel selected will most likely be the appropriate one. However, as earlier indicated, a receiver with such standby power supply provisions is not well suited to situations in which it is to be turned on by the application of AC line power. However, despite the availability of last channel saving provisions, it may be desirable to allow the user to program an initial channel or other television signal source, such as one providing baseband video and audio signals, which is independent of the last input signal source selection. For example, such initial signal source selection provisions are useful when a television receiver is intended for use with a number of television signal sources such as a cable converter connected to the RF input and a video disc player, a video tape recorder and a home computer connected to respective baseband signal inputs to ensure that the preferred signal source is always selected initially when the receiver is turned on.

In accordance with an aspect of the present invention, an auxiliary control unit for an electronic television receiver or the like includes programming apparatus not affected by normal input signal source selection for programming a preferred channel or other signal source desired for initial input signal source, a power-up selection detector for detecting when operating power for the receiver is initially developed and an input signal source command generating unit for generating the appropriate command for causing the selection of the programmed input signal source in response to the development of operating power for the receiver. For use in environments where the receiver is to be turned on by the application of AC line power, the auxiliary control unit also includes a power on command generating unit for generating the appropriate command for causing the receiver to be turned on in response to the development of operating power (prior to causing the selection of the programmed input signal source).

In accordance with another aspect of the invention, the auxiliary control unit is connected to the control lines between the user control unit such as a keyboard and the receiver control unit, which is normally responsive to the user control unit to control the on/off and input signal source selection functions, and simulates the commands normally generated by the user control unit to turn the receiver on and/or select a programmed input signal source in response to the development of operating power.

In accordance with still another aspect of the invention, the auxiliary control unit develops operating power from logic signals on the control lines between the user control unit and the receiver control unit.

Figure 2:
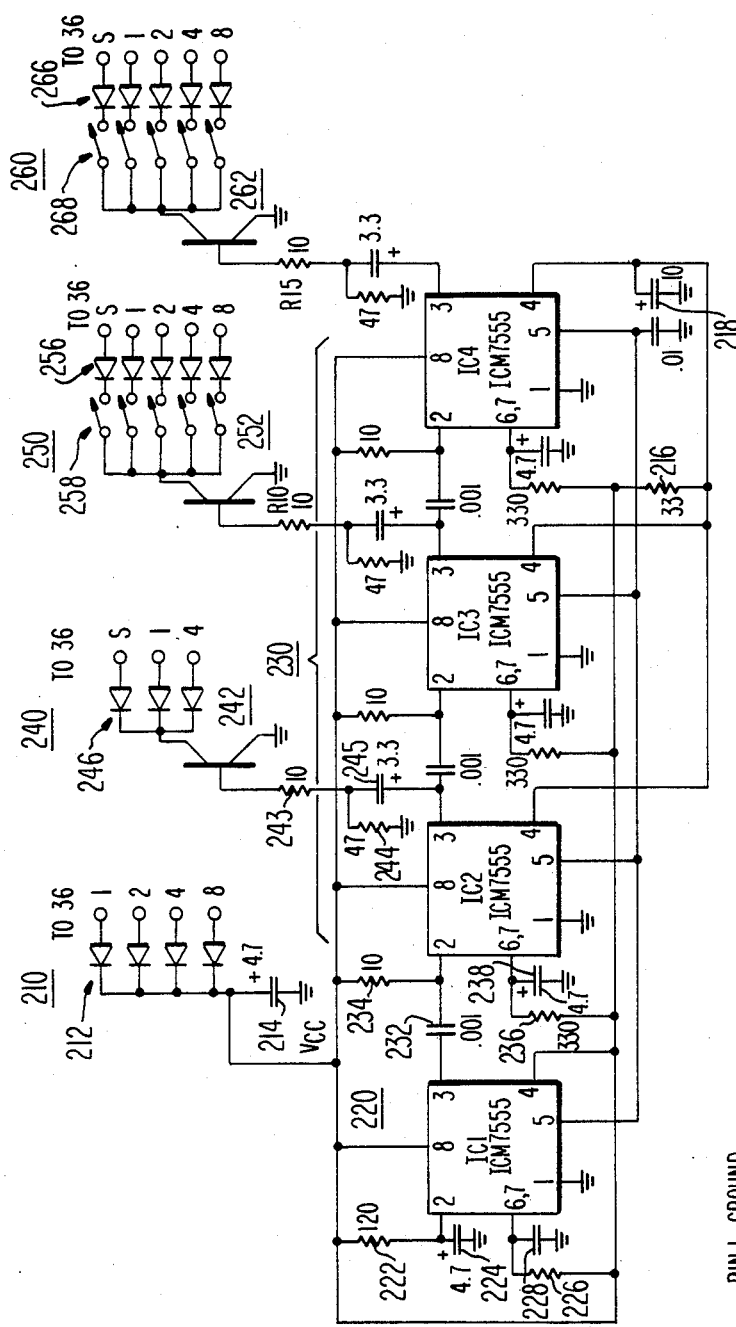

These and other aspects of the present invention will be described with reference to a preferred embodiment shown in the accompanying Drawing in which:

FIG. 1 shows, in block diagram form, a television receiver employing an auxiliary control unit constructed in accordance with an aspect of the present invention; and FIG. 2 shows, in schematic diagram form, an implementation of the auxiliary control unit shown in block diagram form in FIG. 1.

In FIG. 1, television receiver 10 is of conventional design and may, for example, comprise an RCA television receiver model FKC 2022T employing a CTC 131 chassis available from RCA Corporation, Indianapolis, Ind. and described in "RCA Color Television Basic Service Data CTC 131 Series" File 1984, CTC 131 and in "RCA Television Supplemental Service Data CTC 131 Series", File 1984, CTC 131-S1. Receiver 10 includes a tuner, IF and demodulation section 12 for receiving and tuning RF signals corresponding to selected channels to produce an IF signal and for demodulating the IF signal to produce baseband video and audio signals. The video and audio signals are coupled to a signal processing unit 14 in order to provide video and audio responses by means of a picture tube 16 and a speaker 18. Baseband audio and video signals may also be provided by external signal source selection unit 20 which selectively supplies baseband audio and video signals from external sources such as video tape recorders, home computers or the like that may be connected to video and audio input terminals 22 arranged corresponding to respective external signal sources.

Various operating voltages (only one is indicated for convenience) for tuner, IF and demodulation section 12, signal processing unit 14 and external signal selection switching unit 20 are provided from a main power supply which is energized from AC power supply lines 26.

Various functions of television receiver 10 are controlled by a receiver control unit 28. Receiver control unit 28 controls the on/off state of television receiver 10 by the application of an on/off control signal to main power supply 24. It also controls the channel tuned by tuner, IF and demodulation section 12 by the application of a digital word comprising a group of coded signals or bits representing the corresponding two digit channel number to tuner, IF and demodulation section 12. For the purpose of tuning receiver 10 to various channels, tuner, IF and demodulation unit 12 may, for example, include a phase locked loop for providing an appropriate tuning voltage in response to the channel number representative signals. Receiver control unit 28 also controls the selection of the external sources by coupling digital words representing numbers not corresponding to legitimate channel numbers, e.g., numbers above 90, to external signal source slection unit 20. Thus, for example, a first external signal source is selected in response to the number 91, a second in response to 92 and a third in response to 93. Receiver control unit 28 also controls various functions of signal processing unit 14 such as the volume level. For this purpose, receiver control unit 28 may, for example, contain a digital-to-analog converter which is responsive to binary signals representing the volume level stored in a register.

Operating voltages (only one is shown for convenience) for receiver control unit 28 are supplied by a standby power supply 30 which is operative even when the receiver is off and main power supply 24 is not supplying operating voltages. Accordingly, the control status of receiver 10 is maintained by receiver control unit 28 even when the receiver is off. Thus, the on/off state, the last channel number and the volume level are maintained when receiver 10 is off. However, this information is lost when the receiver is unplugged from AC power lines 26 or AC line voltage is removed from AC line 26 as will be explained below.

Receiver control unit 28 receivers user generated commands from a keyboard 32 through control lines. Keyboard 32 includes a power (on/off) key for turning the receiver on and off, volume up and volume down keys for controlling the volume level and digit keys 0–9 for entering the channel number of a desired channel or the two digit number (i.e., illegitimate channel number) corresponding to a desired external signal source by first depressing the tens digit and thereafter depressing the units digit. Each key is represented by digital word comprising a group of coded signals or bits, for example, in binary coded decial format as is indicated in FIG. 1 by the equivalent decimal values 1, 2, 4 and 8 on respective control lines. When a key is depressed, associated contacts are closed to cause the active state of each bit position of the corresponding digital word to be developed on the respective control lines. In the present embodiment, the active state of the bits of the digital words is represented by a contact closure to signal ground potential. After all the contacts for a depressed key have been closed, a strobe level, also signal ground in this embodiment, is generated. Each control line between keyboard 32 and receiver control unit 28 has a respective pull-up resistor 34 receiving a positive supply voltage from standby power supply 30 associated with it to prevent noise components near ground potential from erroneously activating receiver control unit 28. Receiver control unit 28 responds to the digital words and the strobe signal to control the functions as described above. The control lines of keyboard 32 are coupled to receiver control unit 28 through a connector 36, the significance of which will respect to the invention will be described below.

As earlier described, in an institutional environment, it is desirable to use a central control station such as central control station 100 shown in FIG. 1, to turn receivers such as receiver 10 on and off by the selective application of AC line power to the receivers. However, since electronically controlled receiver 10 is placed in the off state when Ac line power is removed and is not placed in the on state unless caused to do so in response to a user command, the application of AC line power through central control unit 100 will not turn receiver 10 on. In addition, when AC line power is removed from receiver 10, the last channel will be lost. Accordingly, if receiver 10 were turned on after the reaplication of AC line power it would probably not tune the channel or select the external signal source needed in the institution. This is so because the channel tuned will either be a random one or as in the case of the RCA CTC-131 referred to above the lowest channel.

To overcome the above-described problems, an auxiliary control unit 200 is connected to the control lines between keyboard 32 and receiver control unit 28 at connector 36 to automatically turn receiver 10 on and to cause it to tune the appropriate channel or select the appropriate external signal as required in the institutional environment when AC line power is initially applied by central control unit 200. Auxiliary control unit 200 accomplishes this by simulating user initiated on and channel or other signal source selection commands in response to the development of operating power when AC line power is applied by central control unit 100. Specifically, when AC line power is initially applied to receiver 10 by central control station 100, a power supply unit 210 of auxiliary control unit 200 developes an operating voltage for auxiliary control unit 200 to initiate its operation. Advantageously, to develop the operating voltage, power supply unit 210 simply draws current from the standby power supply 30 through pull-up resistors 34. A power-up detector 220 senses the development of the operating voltage and generates a pulse indicating this occurrence. In response to "power-up" pulse, a sequencer 230 generates a sequence of three pulses which are coupled in turn to a power-on control unit 240, a tens control unit 250 and a units control unit 260.

The pulse received by power-on unit 230 simultaneously generates a group of pulses for forming the digital word corresponding to power-on command and a strobe pulse (i.e., the same command that is produced when the power key of keyboard 32 is depressed). The "on" digital word and the corresponding strobe signal is coupled by connector 36 and the control lines to receive control unit 28 and receiver 10 is caused to turn on. (Although when a key of keyboard 32 is depressed, the strobe signals are generated slightly later than the key representative digital word, the strobe pulses generated by power-on unit 230, as well as by tens unit 240 and units unit 260, are generated simultaneously with the digital words. Nevertheless, receiver control unit 28 responds in the same manner as it does to the commands generated by keyboard 32 since the timing sequence is not critical).

Each of tens control unit 250 and units control unit 260 include programming switches (shown in FIG. 2) to allow the initial channel or external signal source to be programmed by the operator of the institution. When the corresponding pulses are sequentially received by tens control unit 250 and units control unit 260, the digital words and corresponding strobe signals for the tens and units digit of the channel or external signal source number are caused to be generated in sequence. This causes the desired channel number or external signal source to be selected.

Power supply unit 210 and power-on 240, tens unit 250 and units unit 260 include isolation devices (also shown in FIG. 2) so that the operation of keyboard 32 to supply user generated commands to receiver control unit 28 is not disturbed by auxiliary control unit 200. That is, once the initial power on and channel or input selection operation is completed by auxiliary unit 200, the operation of receiver 10 is not affected by control unit 200 (i.e., it is as if control unit 200 were not present). These and other aspects of auxiliary control unit 200 will be described with reference to the implementation shown in FIG. 2.

In FIG. 2, typical circuit values are indicated by way of example. Resistor values are in kilohms and capacitance values are in microfarads.

In the implementation of auxiliary control unit 200 shown in FIG. 2, power supply unit 210 for developing a positive supply voltage simply comprises a plurality of isolation diodes having their anodes connected to respective control lines between keyboard 32 and receiver control unit 28 at respective terminals of connector 36 and a filter capacitor 214 connected to the cathodes of diodes 212. The isolation diodes prevent interference with the normal interaction between keyboard 32 and receiver control unit 28.

Power up detector 220 and sequencer 230 comprise four "timer" integrated circuits IC1–IC4 connected as monostable multivibrators (one-shots) which are coupled in cascade. Each of IC1–IC4 may, for example, comprise a type ICM 7555 timer IC available from Intersil, Inc. of Cupertino, Calif.. The ICM 7555 utilizes CMOS (complementary metal oxide semiconductor) devices. The use of CMOS ICs in this application is desirable since their low power demand is compatible with using pull-up resistors 34 to supply operating power to auxiliary control unit 200. The reset terminals (4) of each of IC1–IC4 are connected to the VCC supply line. Since the ICs are reset in response to the application of a relatively low voltage to their reset terminals (4), each of IC1–IC4 is initially reset and remains reset until VCC reaches a predetermined level. By virtue a delay network comprising a resistor 216 and a capacitor 218, IC2–IC4 comprising sequencer 230 are held reset slightly longer than IC1 comprising power up detector 220. Since, as will be described below, IC2–IC4 comprising sequence 230 cause the development of the power on and tens and units digital commands for tuning receiver 10 on and selecting the initial channel or other input source, keeping IC2–IC3 reset until the proper sequence is initiated by power up detector 220 prevents erroneous control commands.

Since, the trigger input terminal (2) of IC1 is initially at a low logic level by virtue of its connection to the junction between a resistor 222 and a capacitor 224 connected between the VCC line and signal ground, the high logic level will be developed at its output terminal (3). The high logic level will continue to exist for a time duration determined by a timing network comprising a resistor 226 and a capacitor 228. The latter time duration is chosen long enough for receiver control circuit 28 to be able to reliably process commands. When the time duration has elapsed, the high logic level at the output terminal (3) of IC1 falls to the low logic level and a negative going transition is coupled through a differentiator network comprising a capacitor 232 and a resistor 234 to the trigger input terminal (2) of the first timer IC, IC2, of sequencer 230. This causes a positive-going pulse to be developed at its output terminal which has a duration determined by a timing network comprising a resistor 236 and a capacitor 238. The positive-going pulse is coupled to the base of an NPN transistor 242 included in power on unit 240 through a coupling network comprising resistors 243 and 244 and a capacitor 245 and causes transistor 242 to be turned on. The collector of transistor 242 is connected to the cathodes of a plurality of isolation diodes 246 while serving the same function as isolation diodes 212. The anodes of diodes 246 are connected to respective control lines corresponding to the receiver on command, as indicated, between keyboard 32 and receiver control unit 28 at connector 36. When transistor 242 is turned on, the control line corresponding to the on command a caused to be at the low logic level and, in response, receiver control unit 28 causes receiver 10 to be turned on.

When the positive-going pulse generated at the output terminal (3) of IC2 ends, a negative-going pulse is coupled to the trigger input terminal of IC3 (2) of tens control unit 250 which is connected in similar fashion to IC2. The negative-going pulse causes a positive-going pulse to be generated at the output terminal (3) of IC3. The output terminal (3) of IC3 is coupled to a transistor 252 corresponding in function to transistor 242. The collector of transistor 252 is coupled to the control lines by way of isolation diodes 256 and programming switches 258. The ones of programming switches 258 which are closed by the institution operator determine the tens digit of the channel or input source when transistor 252 is turned on in response to the positive-going pulse generated at the output of IC3.

It will be noted that the strobe control line is also coupled through one of programming switches 258. This is because it is desirable to decouple the strobe control line from auxiliary control unit 200 when the use of auxiliary control unit 200 for input signal source selection is not desired but its use for automatically turning the receiver on is desired. In the former case, it is desirable to open all the programming switches to ensure that no erroneous control signals are generated. In this regard, it is also noted that power supply unit 210 does not include a connection to the strobe control line so that erroneous strobe signals, which may cause the entry of erroneous commands, are not generated. Along these lines, it may be also desirable to provide a jumper or other switching device between filter capacitor 214 of power supply unit 210 and the VCC supply line to ensure that auxiliary control unit 200 cannot possibly generate erroneous digital commands when its use is not desired.

Units control unit 260, including IC4, transistor 262 isolation diodes 266 and programming switches 266, is similar in structure and function to tens control unit 250 and is caused to operate in sequence after tens control unit 250 in response to the termination of the positive-going pulse at the output terminal (3) of IC3 to generate the units digital command.

While auxiliary control unit 200 shown in FIGS. 1 and 2 is limited to generating the power on and channel or other input signal selection commands, it may be modified to produce commands for controlling other functions when operating power is initially developed. For example, it may be modified to set the volume to a predetermined level, e.g., by causing a volume up command to be generated for a predetermined duration. These and other modifications are intended to be within the scope of the invention defined by the following claims.

What is claimed is:

1. For use with a receiver including input selection means for selecting an input signal source from a plurality of input signal sources, user command generating means including input signal source designation means for generating a coded designation of an input signal source to be selected when operated by a user under normal operating conditions, receiver control means for controlling various functions of said receiver including causing said input selection means to select the input signal source corresponding to the coded designation generated by said user command generating means when operated by a user in a normal operating mode, signal processing means for producing an information response in accordance with the selected input signal source, and power supply means for supplying operating power to various portions of said receiver, auxiliary control apparatus comprising:

programmable initial input selection means for storing in a unique memory location, even in the absence of said operating power, a coded representation of a preferred input signal source desired to be selected when said operating power is initially developed, said coded representation of said preferred initial input signal source being unaffected by the operation of said user command generating means to select an input signal source in said normal operating mode;

power up detection means coupled to said power supply means for generating a power up indicating signal in response to the initial development of said operating power;

coupling means coupled to said programmable initial input signal source selection means, said receiver control means and to said power up detection means for selectively coupling said unique memory location of said programmable initial input means to said receiver control means so that said coded designation of said preferred initial input signal source is coupled to said receiver control means to thereby cause said preferred initial input signal source to be selected in response to said power up indicating signal and thereafter decoupling said unique memory location of said programmable input signal selection means from said receiver control means to inhibit said programmable input selection means from interfering with the selection of any of said plurality of input signal sources during said normal operating mode.

2. The system recited in claim 1, wherein in said receiver, said power supply means includes main power supply means for developing main operating power for said signal processing means when said receiver is connected to a source of AC line power and when caused to do so in response to a user initiated power on command and standby power supply means for developing standby operating power for said receiver control means when said receiver is connected to said source of AC line power, said user command generating means includes power on command means for generating a coded representation of said power on command for turning said receiver on when operated by a user, and said receiver control means causes said main power supply means to supply operating power to said signal processing means, when said receiver is connected to said source of AC line power, in response to the generation of said coded representation of said power on command and thereby turn said receiver on, and wherein, in said auxiliary control apparatus:

said power up detection means is coupled to said standby power supply means to sense the initial development of standby operating power; and said coupling means selectively couples said coded designation of said preferred initial input signal source to said receiver control means when standby operating power is initially developed.

3. The system recited in claim 2 wherein said auxiliary control apparatus further includes:

auxiliary power on command generating means for generating a coded representation of an auxiliary on command; and said coupling means is also coupled to said auxiliary on command generating means for selectively coupling said coded representation of said auxiliary power on command to said receiver control means prior to coupling said coded designation of said preferred initial input signal source to said receiver control means when standby operating power is initially developed to thereby turn said receiver on prior to the selection of said preferred initial input signal source.

4. The system recited in claim 3 wherein, in said receiver, said user command generating means comprises a keyboard and said input signal source designation means includes digit keys for generating coded representations of the tens and units digits of a two digit number designating the input signal source to be selected when operated by a user and said power on command means includes a power on key for generating said coded representation of said power on command when operated by a user, and said receiver control means responds to the sequential generation of said coded representations of the tens and units digits of the two digit number designating the input signal source to be selected by said user command generating means when the corresponding digit keys of said keyboard are sequentially operated by a user, and wherein, in said auxiliary control apparatus:

said programmable means stores coded representations of the tens and units digits of the two digit number designating the preferred initial input signal source; and said coupling means includes sequence means for causing said coded representations of said auxiliary on command and of the tens and units digits of the two digit number designating the preferred initial input signal source to be sequentially coupled to said receiver control means in the order named when operating power is initially developed.

5. The system recited in claim 4 wherein, in said auxiliary control apparatus:

said sequence means includes first, second, and third monostable multivibrators coupled in cascade and having respective outputs coupled to a tens digit code generating means for generating said coded representations of the tens digit of the two digit number designating the preferred initial input signal source, a units digit code generating means for generating said coded representation of the units digit of the two digit number designating the preferred initial input signal source, and a power on code generating means for generating said coded representation of said auxiliary power on command, said tens and units code generating means comprising said programmable initial input signal selection means, said power on code generating means comprising said auxiliary power on command generating means, said first monostable multivibrator having a trigger input coupled to said power up detection means.

6. The system recited in claim 4 wherein, in said receiver, said user command generating means is coupled to said receiver control means by control conductors conveying respective bits of digital words comprising said coded representations of the tens and units digits of the two digit number designating the input signal source and said power on command, and wherein, in said auxiliary control apparatus:

said tens, units and power on code generating means are coupled to said control conductors.

7. The system recited in claim 6 wherein, in said auxiliary control apparatus:

said tens, units and power on code generating means are coupled to said control conductors through respective groups of unidirectional conduction devices.

8. The system recited in claim 7 wherein, in said auxiliary control apparatus:

said tens and units code generating means are coupled to said control conductors through respective groups of programming switches.

9. The system recited in claim 8 wherein, in said receiver, logic pull-up elements are coupled between said standby power supply means and respective ones of said control conductors, and wherein, said auxiliary control apparatus further includes:

auxiliary power supply means coupled to at least one control conductor for developing operating power for said auxiliary control apparatus by drawing current through the respective one of said pull-up elements.

10. The system recited in claim 9 wherein, in said auxiliary control apparatus:

said auxiliary power supply is coupled to said one control conductor through a unidirectional conduction device.

11. The system recited in claim 1 wherein, in said receiver, said user command generating means comprises a keyboard and said input signal source designation means includes digit keys for generating coded representations of the tens and units digits of a two digit number designating the input signal source to be selected when operated by a user, and said receiver control means responds to the sequential generation of said coded representations of the tens and units digits of the two digit number designating the input signal source to be selected by said user command generating means when the corresponding digit keys of said keyboard are sequentially operated by a user, and wherein, in said auxiliary control apparatus:

said programmable means stores coded representations of the tens and units digits of the two digit number designating the preferred initial input signal source; and said coupling means includes sequence means for causing said coded representations of said tens and units digits of the two digit number designating the preferred initial input signal source to be sequentially coupled to said receiver control means in the order named when operating power is initially developed.

12. For use with a receiver including signal processing means in accordance with an input signal, main power supply means for developing main operating power for said signal processing means when said receiver is connected to a source of AC line power and when caused to do in response to a user initiated power on command, user command generating means including power on command means for generating a coded representation of said power on command for turning said receiver on when operated by a user, receiver control means for controlling various functions of said receiver including causing said main power supply means to supply operating power to said signal processing means when said receiver is connected to said source of AC line power, in response to the generation of said coded representation of said power on command to thereby turn said receiver on, and standby power supply means for unconditionally developing standby operating power for said receiver control means when said receiver is connected to said source of AC line power, auxiliary control apparatus comprising:

auxiliary power on command generating means for generating a coded representation of an auxiliary on command;

standby power up detection means coupled to said standby power supply means for sensing the initial development of standby operating power; and coupling means coupled to said auxiliary power on command generating means and to said standby power up detection means for selectively coupling said coded representation of said auxiliary on command to said receiver control means when standby operating power is initially developed to thereby cause said receiver to be turned on.

13. The system recited in claim 12 wherein said receiver further includes input selection means for selecting one of a plurality of input signal sources to provide said input signal to said signal processing means, wherein said user command generating means includes input signal source designation means for generating a coded designation of an input signal source to be selected when operated by a user under normal operating conditions, and said receiver control means causes said input signal selection means to selectively couple the input signal from the input signal source corresponding to the coded designation generated by said input signal source designation means of said user command generating means, and wherein said auxiliary control apparatus further includes:
  programmable initial input selection means for storing, even in the absence of operating power, a coded representation of a preferred input signal source desired to be selected when said receiver is turned on, said coded representation of said preferred initial input signal source being unaffected by the operation of said input signal source designation means of said user command generating means to select an input signal source under said normal operating conditions; and
  said coupling means is also coupled to said programmable initial input signal source selection means for selectively coupling said coded designation of said preferred initial input signal source to said receiver control means after coupling said coded representation of said auxiliary power on command to said receiver control means when standby operating power is initially developed to thereby cause said preferred initial input signal source after said receiver is turned on.

14. For use with a receiver including power control means for turning the receiver on and off; input selection means for selecting an input signal from a plurality of signal sources; standby power supply means for developing standby operating power for said receiver control means when said receiver is connected to a source of AC power; a user control keyboard including keys for generating corresponding digital words when operated by a user, said keyboard including keys for turning the receiver on and off and for designating an input signal source; receiver control means for controlling various functions of said receiver in response to said coded representations; control conductors coupled between said keyboard and said receiver control means conveying respective bits of said digital words, apparatus comprising:
  auxiliary control means coupled to said control conductors for selectively coupling a plurality of digital words simulating respective ones of said digital words generated by said user control keyboard to said receiver control means to cause said receiver to be turned on and to select a predetermined input source when said standby operating power is initially developed.

15. The system recited in claim 14, wherein, in said receiver, at least one of said control conductors has a pull-up element connected between it and said standby power supply means, and wherein:
  said auxiliary control means includes auxiliary power supply means coupled to said one control conductor for developing operating power for said auxiliary control means by drawing current through said associated pull-up element.

16. Apparatus comprising:
  keyboard means for generating main digital words corresponding to user operable keys;
  control means responsive to said main digital words for performing corresponding functions;
  a plurality of conductors conveying respective bits of said digital words coupled between said keyboard means and said control means;
  a power supply;
  a plurality of pull-up elements coupled between said power supply and respective ones of said conductors;
  auxiliary control means for selectively coupling auxiliary digital words to said control means by way of said conductors, said control means also responding to said auxiliary digital words for performing various functions; and
  auxiliary power supply means coupled to said conductors for generating operating power for said auxiliary control means exclusively by drawing current through said associated pull-up elements.

* * * * *